United States Patent [19]
Jones

[11] Patent Number: 5,452,737
[45] Date of Patent: Sep. 26, 1995

[54] PROPORTIONAL FLUID BLENDING DEVICE FOR BLENDING TWO OR MORE GASES OR LIQUIDS

[76] Inventor: James M. Jones, 413 W. Jefferson, Waxahachie, Tex. 75165

[21] Appl. No.: 311,345

[22] Filed: Sep. 22, 1994

[51] Int. Cl.⁶ ................................................. G05D 11/03
[52] U.S. Cl. ...................... 137/98; 137/114; 137/516.11; 261/50.2
[58] Field of Search ............................. 137/98, 100, 114, 137/516.11, 625.44; 261/50.2, 50.3

[56] References Cited

U.S. PATENT DOCUMENTS

| | | | |
|---|---|---|---|
| 1,063,030 | 5/1913 | Heidelmann | 137/114 X |
| 2,142,665 | 1/1939 | Brett | 137/896 |
| 2,629,448 | 2/1953 | Duggan | 137/516.11 X |
| 4,149,562 | 4/1979 | Johnson | 137/891 |
| 4,197,809 | 4/1980 | Johnson | 137/98 X |
| 4,354,516 | 10/1982 | Newell | 137/98 |
| 4,465,456 | 8/1984 | Hynek | 137/98 X |

Primary Examiner—Robert G. Nilson
Attorney, Agent, or Firm—Jenkens & Gilchrist

[57] ABSTRACT

A device for the blending of gases or liquids having an inlet adapter, a main body, an outlet adaptor, a valve plate, and a spring arm. Air enters the inlet adaptor and passes through an air port in the main body. Fuel is supplied to a fuel port in the main body through a nipple and a passage. The fuel port and the air port share a common valve seating plane and are aligned side by side along the innermost edge of the valve seating plane. The spring arm applies a force to the valve plate which forces the valve plate towards the valve seating plane. The valve plate pivots about the innermost edge of the valve seating plane in response to the downstream demand for the blend and forms a common angle above the air and fuel ports, which results in proportionally exposed port areas. The downstream demand for the blend provides a pressure difference across the valve plate which acts against the valve plate spring to position the valve plate to a balanced position. Air and fuel from the air port and the fuel port exit the blending device through the outlet adapter. Any change in the downstream demand results in the repositioning of the valve plate.

16 Claims, 5 Drawing Sheets

5,452,737

PROPORTIONAL FLUID BLENDING DEVICE FOR BLENDING TWO OR MORE GASES OR LIQUIDS

BACKGROUND OF THE INVENTION

1. Field of the Invention

The present invention relates to mechanical blending systems for gases or liquids, and more particularly to mechanical blending systems which blend two or more fluids proportionally throughout an operation range.

2. History of the Prior Art

There has been a continual search for a simpler means to blend fluids into desirable proportions. Some of the prior art devices include: venturi systems which move a fluid into the high velocity portion of the venturi for blending; systems which utilize a two ported rotating piston; systems using a two ported sleeve valve; systems with separate valves linked together; systems which use variable ports with metering pins; systems which utilize mechanical dampers linked together; systems which use target vanes to sense primary flow and position a piston valve; and systems which utilize electronic devices to position valve plates. However, these devices generally require a sensing and control means to assure proper performance.

It would be a distinct advantage to have a simple blending device which would be capable of delivering a blend which is proportional throughout its operational range, and a blending device which would not require complex sensing and control means. The present invention provides for a very compact and simple blending device having a single valve plate and a single valve seating plane which can contain two or more ports, and provides for a proportional blending of fluids throughout its operational range.

SUMMARY OF THE INVENTION

The art of this invention is the art of providing a proportional blend of two or more fluids proportionally and in varying quantities in response to the downstream demands for such a proportional blend.

In an embodiment of the present invention a fluid blending device comprises a main body, a valve plate, and a means for applying a force to said valve plate. The main body includes a first fluid port and a second fluid port which share a common valve seating plane. The first and second fluid ports have the same geometric shape; however, the first and second fluid ports can be a proportionately different size of the same shape. The first and second fluid ports are also located in the valve seating plane such that a tangential line from a particular geometric location on the circumference of the first fluid port is coaxial with a tangential line on the same geometric location on the circumference of the second fluid port. A valve plate is pivotally mounted to rotate about the coaxial tangent lines of the first and second fluid port. A means for applying a force, forces the valve plate towards the valve seating plane of the main body.

In a further embodiment, the main body includes two bodies, each containing one of the fluid ports. In another further embodiment, the first fluid port is a different size from the second fluid port, having proportionally the same geometric shape.

In another embodiment, the first and second fluid ports are located in the valve seating plane such that a chord line from two particular points on the circumference of the first fluid port is coaxial with a chord line from two points on the second fluid port having the same geometrical location on the circumference of the second fluid port. The valve plate of this second embodiment is pivotally mounted to rotate about the coaxial chord lines of the first and second fluid ports.

In a further embodiment, the present invention includes a plurality of fluid ports, each having a tangent line coaxial with the tangent line located at the same location on the other fluid ports. In yet a further embodiment, the main body includes a plurality of bodies, each body containing at least one of the plurality of fluid ports. In yet another further embodiment, at least two of said plurality of fluid ports are a different size which is proportionally the same geometric shape.

DETAILED DESCRIPTION

Figure 1:
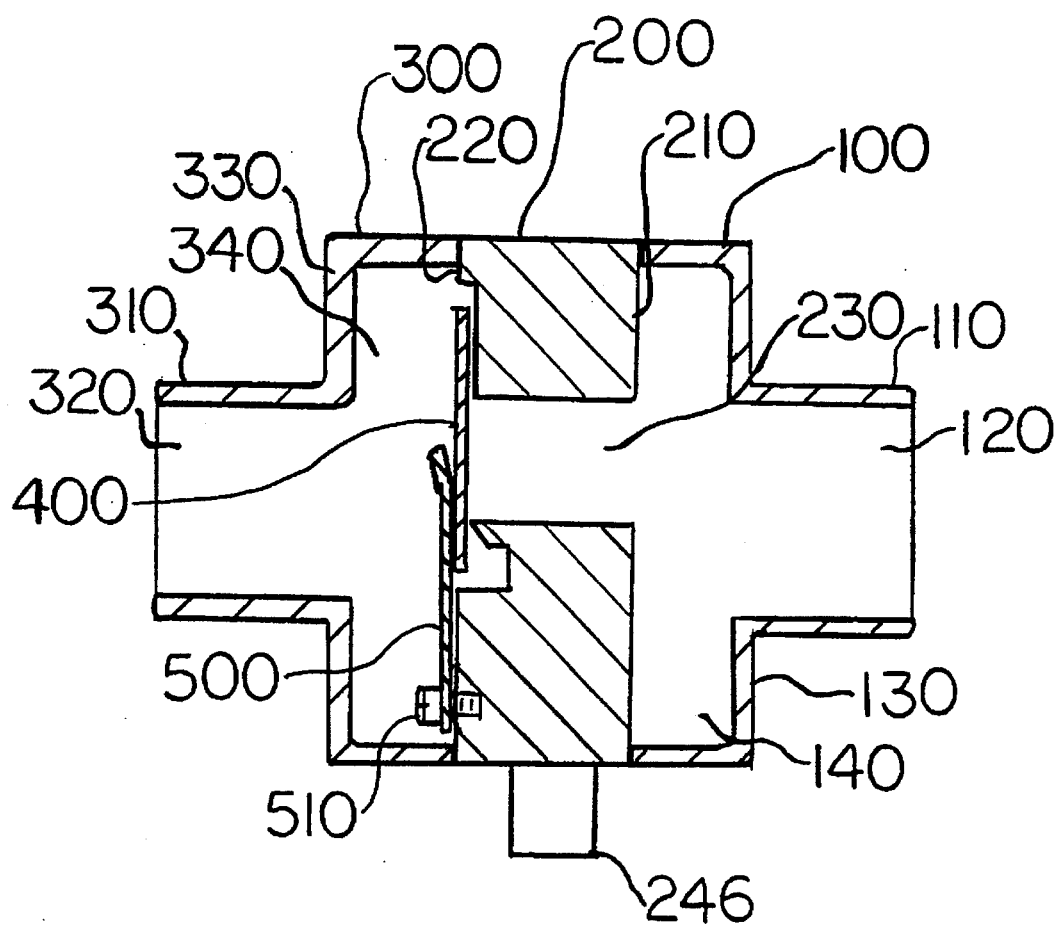
FIG. 1 is a cross sectional illustrating a preferred embodiment of the present invention.

Referring now to the Figures, and more particularly to FIG. 1, there is shown a cross sectional view of a blending unit, indicated generally at 10, illustrating an embodiment of the present invention. The blending unit 10 generally comprises an inlet adaptor 100, a main body 200, an outlet adaptor 300, a valve plate 400, and a spring arm 500.

Still referring to FIG. 1, the inlet adaptor 100 includes a hose connection 110 having an air inlet 120, and an adaptor section 130 having an inlet chamber 140 in fluid communication with the air inlet 120 of the hose connection 110. The adaptor section 130 of the inlet adaptor 100 mounts to an inlet side 210 of the main body 200.

Referring still to FIG. 1 the outlet adaptor 300 includes a hose connection 310 having an air/fuel outlet 320, and an adaptor section 330 having an outlet chamber 340 in fluid communication with the air/fuel outlet 320 of the hose connection 310. The adaptor section 330 of the outlet adaptor 300 mounts to an outlet side 220 of the main body 200.

Figure 2:
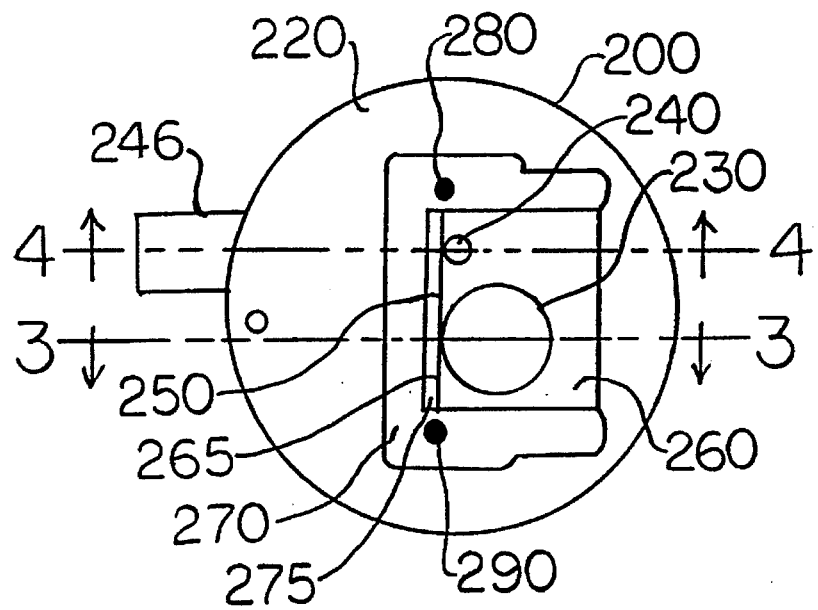
FIG. 2 is a top view of the main body from FIG. 1.
Figure 3:
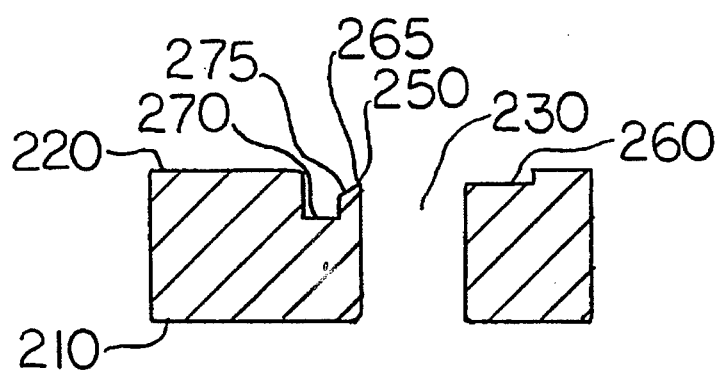
FIG. 3 is a cross section of the main body taken about the sectional lines 3—3 in FIG. 2.
Figure 4:
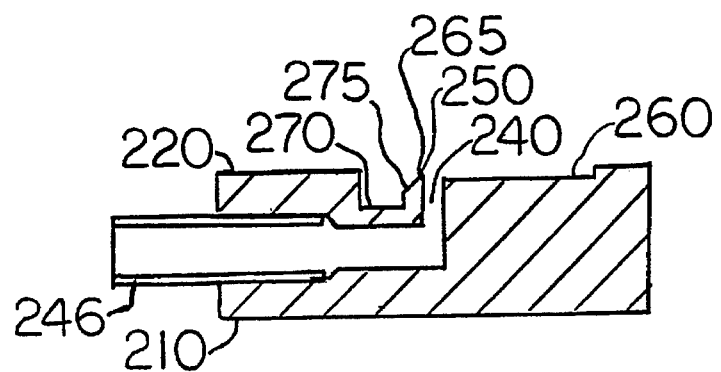
FIG. 4 is a cross section of the main body taken about the sectional lines 4—4 in FIG. 2.

Referring now to FIGS. 2, 3, and 4 in combination, there are shown the outlet side 220 of the main body 200 from FIG. 1, a cross section of the main body 200 taken about the section lines 3—3, and a cross section of the main body 200 taken about the section lines 4—4, respectively. An air port 230 extends from the inlet side 210 of the main body 200 to the outlet side 220 of the main body 200. The outlet side 220 of the main body 200 also has a fuel port 240 which is connected to a fuel nipple 246 by a fuel passage 242.

Still referring to FIGS. 2, 3, and 4 in combination, the air port 230 and the fuel port 240 have the same geometric shape; however, the fuel port 240 is proportionally smaller than the air port 230. Although the air port 230 and the fuel port 240 are illustrated as having a circular geometric shape, a person of ordinary skill in the art will understand that other geometric shapes can be used without change in the principles of the present invention. The air port 230 and the fuel port 240 are positioned in the outlet side 220 of the main body 200 so that tangential lines on the same circumferential location of the air port 230 and the fuel port 240 share the same axis 250.

Referring still to FIGS. 2, 3, and 4 in combination, the air port 230 and the fuel port 240 share a common valve seating plane 260 in the outlet side 220 of the main body 200. The valve seating plane 260 has an edge 265 which aligns with the axis 250. A valve plate recess 270 in the outlet side 220 of the main body 200 surrounds the valve seating plane 260 and is connected to the edge 265 of the valve seating plane 260 by a bevel 275. A first pin 280 and a second pin 290 extend from the outlet side 220 of the main body 200 and are centered on the axis 250.

Figure 5:
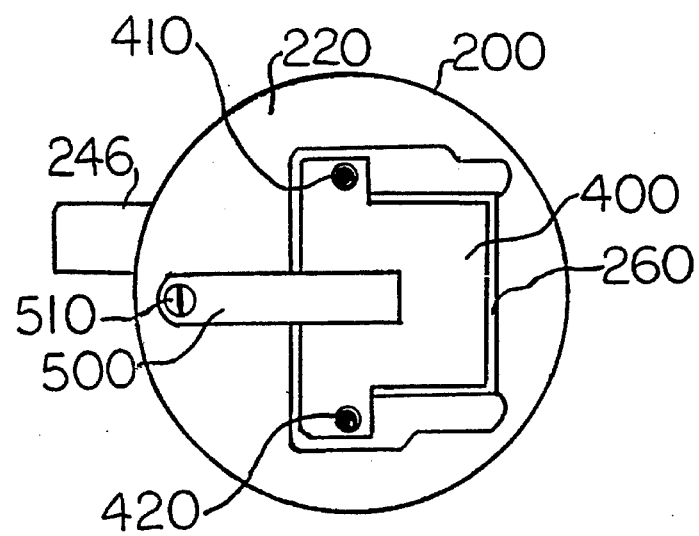
FIG. 5 is a top view of the main body from FIG. 1.
Figure 6:
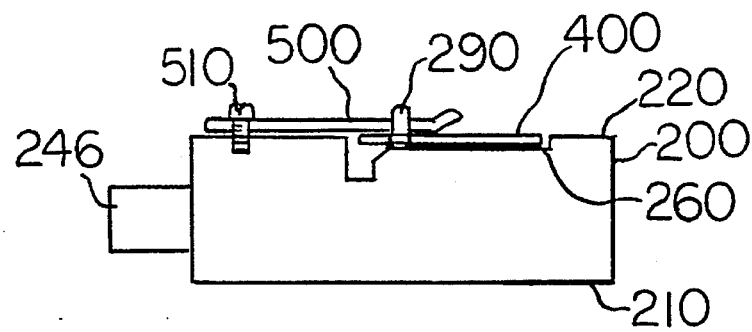
FIG. 6 is a side view of the main body from FIG. 1.

Referring now to FIGS. 5 and 6, there are shown the outlet side 220, and a side view, respectively, of the main body 200 having the valve plate 400 and the spring arm 500 mounted thereon. The valve plate 400 has a first aperture 410 and a second aperture 420 which slip over the first pin 280 and the second pin 290, respectively, of the main body 200. The spring arm 500 is secured to the main body 200 by a screw 510 and forces the valve plate 400 toward the valve seating plane 260.

Figure 7:
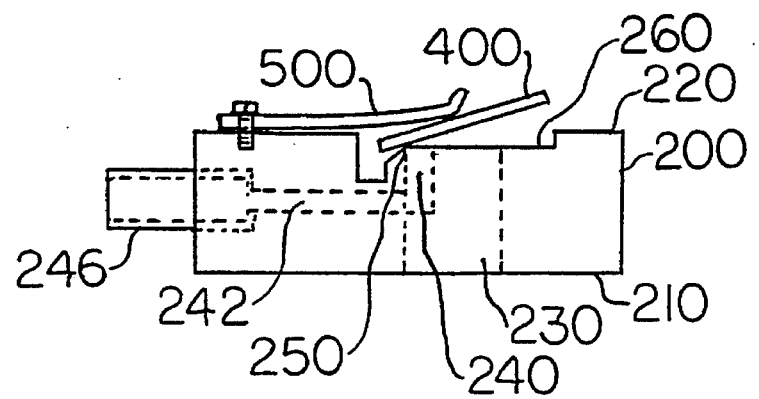
FIG. 7 is a side view of the main body from FIG. 1, illustrating an open position of the valve plate.

Referring now to FIG. 7, there is shown a side view of the main body 200 having the valve plate 400 and the spring arm 500 mounted thereon, with the valve plate 400 in an open position. As the valve plate 400 opens, the valve plate 400 pivots about the axis 250. The rotation of the valve plate 400 about the pivot axis exposes areas of the air port 230 and the fuel port 240 which have the same proportion throughout the operating range of the valve plate 400.

Referring now to FIGS. 1–7 in combination, the operation of the blending device 10 can be explained. In one embodiment, the blending device is mounted between the carburetor and the air filter of an internal combustion engine (not shown). Air from the air filter of the internal combustion is supplied to the blending device 10 through the hose connection 110 of the inlet adaptor 100, and progresses to the air port 230 of the main body. Fuel, such as natural gas or liquified petroleum (LP) gas, from a demand type regulator enters the main body 200 through the fuel nipple 246. Fuel entering the main body 200 through the fuel nipple 246 progresses through the fuel passage 242 to the fuel port 240.

Still referring to FIGS. 1–7 in combination, in the initial condition, the spring arm 500 forces the valve plate 400 against the valve seating plane 260 which is shared by the air port 230 and the fuel port 240. In this initial condition, the valve plate 400 blocks flow from both the air port 230 and the fuel port 240. A down stream demand, such as by the carburetor of the internal combustion engine, creates a pressure difference across the valve plate 400 which acts against the spring arm 500. In response to the pressure differential, the valve plate 400 pivots about the pivot axis 250. As the valve plate 400 pivots, the valve plate 400 forms a valve angle over the valve seating plane 260 resulting in the formation of port areas above the air port 230 and the fuel port 240 which are proportional throughout the operating range of the valve plate 400. Any changes in the downstream demand for the blend will result in the repositioning of the valve plate 40 to a balanced position. Blended air and fuel exits the blending device 10 through the hose connection 310 of the outlet adaptor 300 and is supplied through a hose to the engine's existing carburetor. The blending device 10 described continually senses the blend demands of the internal combustion engine and provides a proportional blend throughout its operational range.

It is thus believed that the operation and construction of the present invention will be apparent from the foregoing description. While the method and apparatus shown and described has been characterized as being preferred, it will be readily apparent that various changes and modifications could be made therein without departing from the spirit and scope of the invention as defined in the following claims. For example, the blending device can be used for applications other than internal combustion engines, such as blending of gases for welding, furnaces, and other applications. Also, the blending device of the present invention can be used for gases or liquids other than air and fuel. As another example, the ports for the fluids to be mixed can be any shape such as rectangular, oval, or the like; provided the ports are the same geometric shape being either the same size or proportionately larger or smaller, and that the ports are oriented with a common tangential line or cord line. As another example, the blending device could have more than two ports for mixing more than two fluids. As another example, the main body can be more than one component, such as having a body for each of the ports, provided that each port shares the same valve seating plane. Therefore, the spirit and scope of the appended claims should not be limited to the description of the preferred embodiments contained herein.

What is claimed is:

1. A fluid blending device comprising:

a main body having a first port and a second port within a valve seating plane of said main body, wherein the first port and the second port have the same geometric shape;

a valve plate pivotally mounted to said main body, about a pivot axis which intersects the first port and the second port in the same geometrical location and direction, wherein said valve plate pivots to contact the valve seating plane of said main body, thereby covering the first port and the second port of said main body;

and means for applying a force to said valve plate which forces said valve plate towards the valve seating plane of said main body.

2. A fluid blending device according to claim 1, wherein the first port is positioned within the valve seating plane of said main body with a tangential line being coaxial with a tangent line from the same geometrical position on the second port in said main body, and wherein the pivot axis of said valve plate is coaxial with the coaxial tangent lines of said first and second ports.

3. A fluid blending device according to claim 1, wherein the first port is positioned within the valve seating plane of said main body with a chord line being coaxial with a chord line from the same geometrical position on the second port in said main body, and wherein the pivot axis of said valve plate is coaxial with the coaxial chord lines of the first and second ports.

4. A fluid blending device according to claim 1, wherein the second port of said main body is proportionally smaller than the first port of said main body.

5. A fluid blending device comprising:

a main body including a plurality of ports disposed within a valve seating plane, the plurality of ports each having the same geometrical shape;

a valve plate pivotally mounted to said main body about a pivot axis which intersects each of the plurality of ports in the same geometrical locations and directions, wherein said valve plate pivots to contact the valve seating plane of said main body, thereby covering the plurality of ports in said main body; and means for applying a force to said valve plate towards the valve seating plane of said main body.

6. The fluid blending device according to claim 5, wherein each of the plurality of ports is positioned within the valve seating plane of said main body with a tangent line from the same geometrical position on each of the plurality of ports being coaxial, and wherein the pivot axis of said valve plate is coaxial with the coaxial tangent lines of said plurality of ports.

7. A fluid blending device according to claim 5, wherein said plurality of ports are positioned within the valve seating plane of said main body with a chord line from the same geometrical position on each of said plurality of ports being coaxial, and wherein the pivot axis of said valve plate is coaxial with the coaxial chord lines of said plurality of ports.

8. A fluid blending device according to claim 5, wherein at least one of the plurality of ports in said main body is proportionally smaller than a second of the plurality of ports in said main body.

9. A fluid blending device, comprising:

a first body including a first port in a seating plane, the first port having a particular geometric shape;

a second body including a second port in a seating plane, the second port having a geometric shape identical to the first port of said first body;

wherein the seating planes of said first and second bodies are positioned in the same valve seating plane, and wherein the first port and the second port are arranged with the same angular orientation;

a valve plate pivotally mounted about a pivot axis, said pivot axis intersecting the same geometric location and direction of first port and the second port, wherein said valve plate pivots to contact the valve seating plane, thereby closing off the first port and the second port of said first and second bodies, respectively; and means for applying a force to said valve plate which forces said valve plate towards the valve seating plane.

10. A fluid blending device according to claim 9, wherein the first port of said first body and the second port of said second body are positioned within the valve seating plane with tangential lines from the same geometrical position on the first and second port being coaxially aligned, and wherein the pivot axis of said valve plate is coaxial with the coaxial tangent lines of the first and second ports.

11. A fluid blending device according to claim 9, wherein the first port of said first body and the second port of said second body are positioned within the valve seating plane with chord lines from the same two geometrical positions on the first and second ports being coaxially aligned, and wherein the pivot axis of said valve plate is coaxial with the coaxial chord lines of the first and second ports.

12. A fluid blending device according to claim 9, wherein the second port of said second body is proportionally smaller than the first port of said first body.

13. A fluid blending device comprising:

a plurality of bodies, each body including a port in a seating plane, wherein the seating planes in each of said plurality of bodies are positioned in the same valve seating plane, wherein the ports in said plurality of bodies each have the same geometrical shape, and wherein the ports in said plurality of bodies are each arranged with the same angular orientation;

a valve plate pivotally mounted about a pivot axis, the pivot axis intersecting the same geometrical location and direction of the ports in said plurality of bodies, wherein said valve plate pivots to contact the valve seating plane, thereby closing off the ports in each of said plurality of ports; and means for applying a force to said valve plate which forces said valve plate towards said valve seating plane.

14. A fluid blending device according to claim 13, wherein the ports in said plurality of bodies are positioned within said valve seating plane with tangential lines from the same geometrical position on each of the ports being coaxially aligned, and wherein the pivot axis of said valve plate is coaxial with the coaxial tangent lines of the ports.

15. A fluid blending device according to claim 13, wherein the ports in said plurality of bodies are each positioned within said valve seating plane with a chord line from the same geometrical position on each of the ports being coaxially aligned, and wherein the pivot axis of said valve plate is coaxial with the coaxial chord lines of the ports.

16. A fluid blending device according to claim 13, wherein the port in at least one of said plurality of bodies is proportionally smaller than the port in a second of said plurality of bodies.

* * * * *

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

Column 2, line 29  Delete "."
Insert --;--

Figure 8:
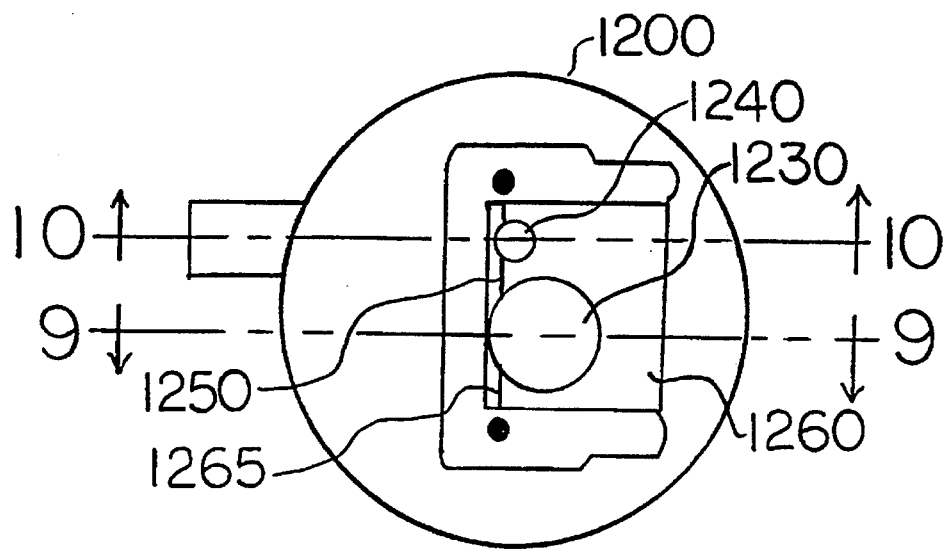
Figure 9:
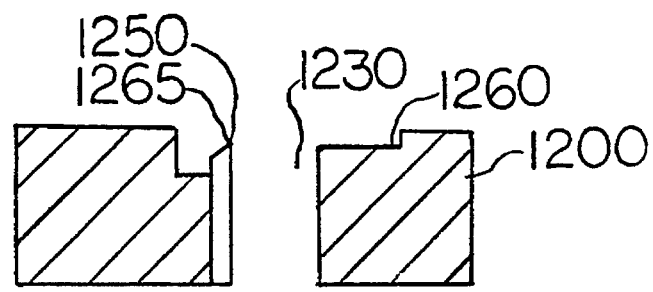
Figure 10:
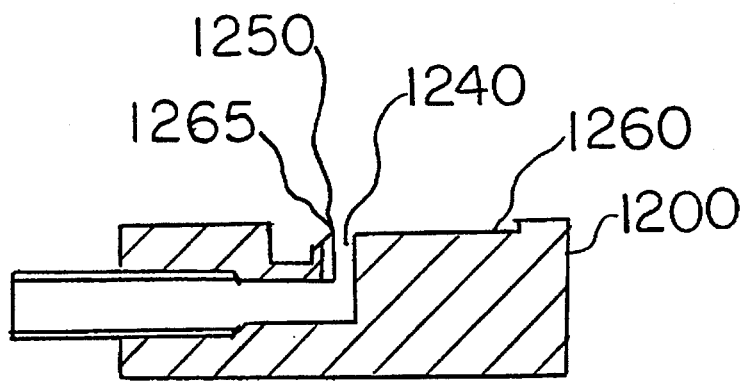
Figure 11:
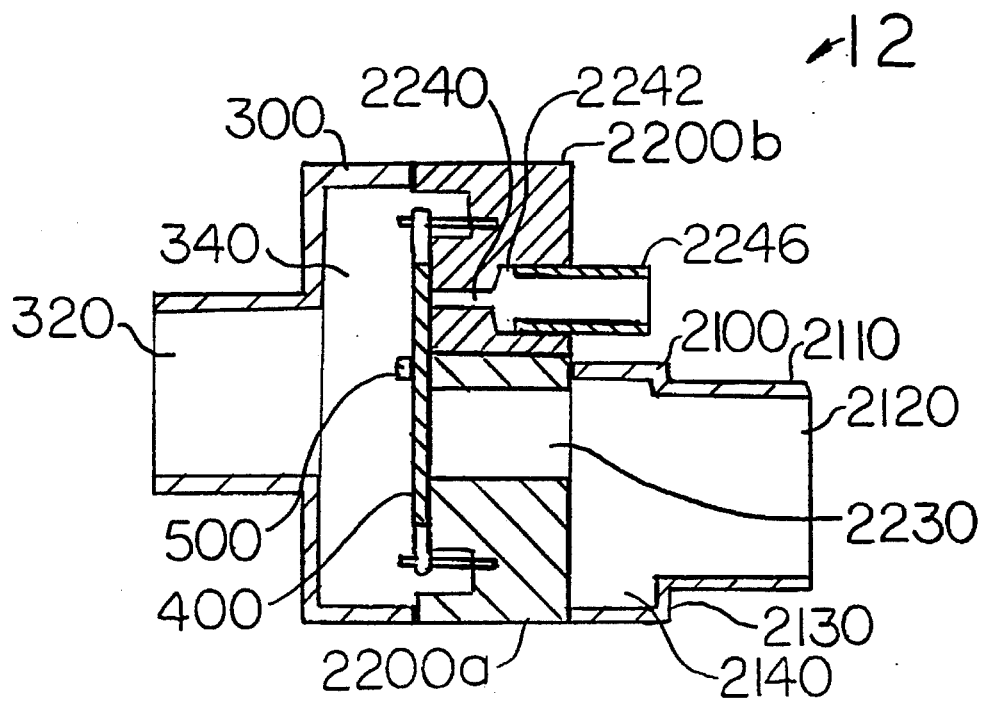
Figure 12:
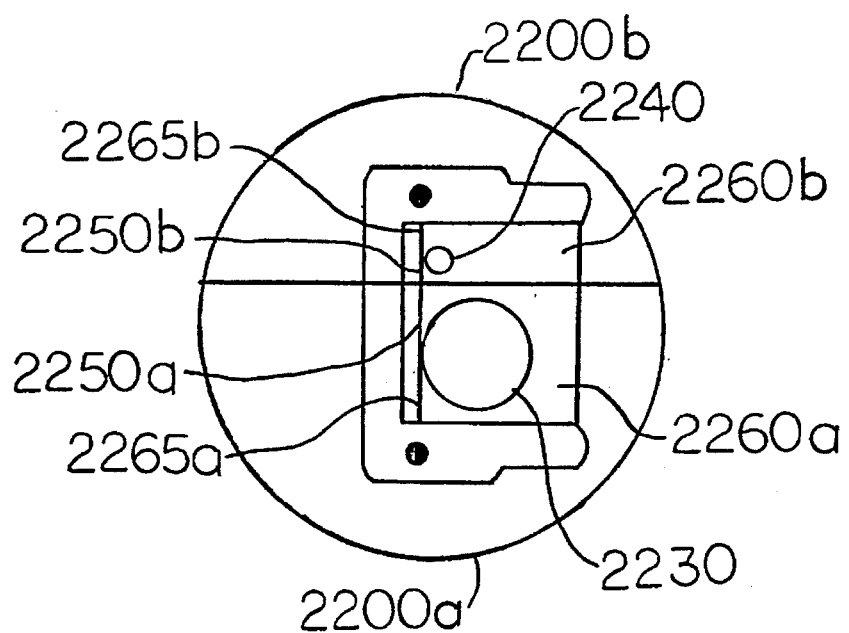

Column 2, line 30  Insert the following:

--FIG. 8 is a front view of an alternate construction of the main body differing somewhat from that of FIG. 1;

FIG. 9 is a cross section of the alternate construction main body in FIG. 8 taken about the sectional lines 9-9;

FIG. 10 is a cross section of the main body in FIG. 8 taken about the sectional lines 10-10;

FIG. 11 is a top cross sectional view of another construction of the present invention, having a first and second body; and FIG. 12 is a front face view of the first and second body in FIG. 11.--

United States Patent and Trademark Office
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

Column 4, line 3          Insert the following:

--Referring now to FIGS. 8, 9, and 10 in combination, there is shown another construction of the main body 200 differing from that of FIG. 1, illustrated as having a main body 1200, a cross section of the main body 1200 being taken about the section lines 9-9, and a cross section of the main body 1200 being taken about lines 10-10, respectively. The main body 1200 has an air port 1230, a fuel port 1240, an axis 1250, a valve seating plane 1260, and a valve seating plane edge 1265 which correspond respectively with the air port 230, the fuel port 240, the axis 250, the valve seating plane 260, and the valve seating plane edge 265 of the main body 200 from FIGS. 2, 3, and 4. Similarly to the air port 230 and the fuel port 240 in FIGS. 2, 3, and 4, the air port 1230 and the fuel port 1240 have the same geometric shape, with the fuel port 1240 being proportionally smaller than the air port 1230. Although the air

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

port 1230 and the fuel port 1240 are illustrated as having a circular shape, a person of ordinary skill in the art will understand that other geometric shapes can be used without change in the principles of the present invention.

Still referring to FIGS. 8, 9, and 10 in combination, the main body 1200 is used in place of the main body 200 in the charge forming fuel system 10 of FIG. 1. The main body 1200 has the same features as the main body 200 in FIG. 1; however, the air port 1230 and the fuel port 1240 are positioned such that a chord line from two particular points on the circumference of the air port 1230 is coaxial along an axis 1250, which is also coaxial with a chord line from two points on the circumference of the fuel port 1240 having the same geometrical position as the two points on the circumference of the air port 1230. The edge 1265 of the valve seating plate 1260 is coaxial with the axis 1250. In this manner, the valve plate 400 (shown in FIGS.

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

1, 5, 6, and 7) will pivot about the edge 1265 and the axis 1250.

Referring now to FIG. 11, there is shown a top cross sectional view of another construction of the present invention, illustrated as the charge forming fuel system 12. Similarly to the charge forming fuel system 10 in FIG. 1, the charge forming fuel system 12 includes the outlet adaptor 300 having the outlet chamber 340 and the air/fuel outlet 320, the valve plate 400, and the spring arm 500. However, the main body of the charge forming fuel system 12 comprises a first body 2200a and a second body 2200b. Also, the inlet adaptor of the charge forming fuel system 12 has been designed as the inlet adaptor 2100 which accommodates the two piece main body of the charge forming fuel system 12.

Still referring to FIG. 11, the first body 2200a includes the air port 2230. The inlet adapter 2100 covers the air port

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

2230 on the opposing side from the outlet adaptor 300. The inlet adaptor 2100 includes a hose connection 2110 having an air inlet 2120, and an adaptor section 2130 having an inlet chamber 2140 in fluid communication with the air inlet 2120 of the hose connection 2110. The adaptor section 2130 of the inlet adaptor 2100 mounts to the first body 2200a covering the air port 2230. The second body 2200b includes a fuel port 2240. The fuel port 2240 is connected to a fuel nipple 2246 by a fuel passage 2242.

Referring now to FIG. 12, there is shown the outlet sides of the first body 2200a and the second body 2200b. The first body 2200a has a valve seating plane 2260a which is positioned in the same plane as valve seating plane 2260b of the second body 2200b. The air port 2230 and the fuel port 2240 pass through the valve seating plane 2260a and the valve seating plane 2260b, respectively. The air port 2230 and the fuel port 2240 have the same geometric shape; however, the fuel port 2240

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

is proportionally smaller than the air port 2230. Although the air port 2230 and the fuel port 2240 are illustrated as having a circular shape, a person of ordinary skill in the art will understand that other geometric shapes can be used without change in the principles of the present invention.

Still referring to FIG. 12, an edge 2265a of the valve seating plane 2260a is coaxial with an edge 2265b of the valve seating plane 2260b. An axis 2250a is tangential to a specific geometrical position on the air port 2230 and is coaxial with the edge 2265a of the valve seating plane 2260a. An axis 2250b is tangential to a specific geometrical position on the fuel port 2240 which corresponds with the same geometrical position of the axis 2250a on the air port 2230. The axis 2250b is also coaxial with the edge 2265b of the valve seating plane 2260b. Because the edge 2265a is coaxial with the edge 2265b, the axis 2250a is coaxial with the axis 2250b, and the valve plate 400

UNITED STATES PATENT AND TRADEMARK OFFICE
CERTIFICATE OF CORRECTION

PATENT NO. : 5,452,737
DATED : September 26, 1995
INVENTOR(S) : James M. Jones

It is certified that error appears in the above-indentified patent and that said Letters Patent is hereby corrected as shown below:

```
will control the flow through the charge forming fuel system 12 in the same manner as in the charge forming fuel system 10.--
```

Column 4, line 20     Delete "cord"
                          Insert --chord--

Signed and Sealed this

Seventh Day of May, 1996

Attest:

BRUCE LEHMAN

Attesting Officer     Commissioner of Patents and Trademarks